(12) United States Patent
Ye

(10) Patent No.: US 12,374,980 B2
(45) Date of Patent: Jul. 29, 2025

(54) RECIPROCATING MAGNETIC LEVITATION LINEAR MOTOR AND ELECTRIC SHEAR DEVICE

(71) Applicant: Shenzhen Shuye Technology Co., Ltd., Guangdong (CN)

(72) Inventor: Hongxin Ye, Zhejiang Province (CN)

(73) Assignee: Shenzhen Shuye Technology Co., Ltd., Shenzhen (CN)

( * ) Notice: Subject to any disclaimer, the term of this patent is extended or adjusted under 35 U.S.C. 154(b) by 350 days.

(21) Appl. No.: 18/295,379

(22) Filed: Apr. 4, 2023

(65) Prior Publication Data
US 2024/0213868 A1 Jun. 27, 2024

(30) Foreign Application Priority Data
Dec. 26, 2022 (CN) .......................... 202211676481.9

(51) Int. Cl.
*H02K 41/02* (2006.01)
*H02K 5/22* (2006.01)
*H02K 5/24* (2006.01)

(52) U.S. Cl.
CPC ............... *H02K 41/02* (2013.01); *H02K 5/22* (2013.01); *H02K 5/24* (2013.01)

(58) Field of Classification Search
CPC . B26B 19/282; F16F 1/027; F16F 1/18; F16F 15/073; F16F 2234/06; H02K 1/34; H02K 33/18; H02K 41/02; H02K 5/22; H02K 5/24; H02K 7/145
See application file for complete search history.

(56) References Cited

U.S. PATENT DOCUMENTS 5,955,799 A * 9/1999 Amaya ................. B26B 19/282
310/36

FOREIGN PATENT DOCUMENTS

JP 11285226 A * 10/1999

* cited by examiner

*Primary Examiner* — Naishadh N Desai

(57) ABSTRACT

The linear moto includes a bracket, two elastic support modules, a driving assembly, and a motion assembly suspended above the driving assembly. The driving assembly is mounted on the bracket and configured to drive the motion assembly to reciprocate in a predetermined direction. The motion assembly has two ends in the predetermined direction, two elastic support modules are configured to connect the two ends to the bracket, respectively. Each of the two elastic support modules includes a plate spring sheet, an adapter assembly, and a first connection member, the plate spring sheet has a first connection end and a second connection end, the first connection end is fixedly connected to the motion assembly, the first connection member extends through and connects to the second connection end and the adapter assembly, the plate spring sheet is fixedly connected to the bracket via the adapter assembly.

20 Claims, 7 Drawing Sheets

RECIPROCATING MAGNETIC LEVITATION LINEAR MOTOR AND ELECTRIC SHEAR DEVICE

CROSS REFERENCE TO RELATED APPLICATIONS

The present application claims the priority of the Chinese patent application No. 202211676481.9, filed on Dec. 26, 2022, and the contents of which are incorporated herein by its entireties.

TECHNICAL FIELD

The present disclosure relates to the field of linear motors, and in particular to a reciprocating magnetic levitation linear motor and an electric shear device.

BACKGROUND

A reciprocating magnetically levitated linear motor, also known as a linear motor, mainly includes a moving assembly (actuator) and a driving assembly (stator). The moving assembly includes a permanent magnet. The driving assembly includes an electromagnet formed by a coil winding an iron core. A gap is defined between the permanent magnet and the core coil. In the reciprocating linear motor, the permanent magnet moves back and forth at a certain frequency with respect to the core coil. In this case, an elastic support member is required to provide support to ensure the gap between the permanent magnet and the core coil. In addition, the elastic support member also provides an elastic returning force to enable the permanent magnet to move reciprocatively.

For the linear motor in the art, the elastic support member is configured as an elastic sheet. An end of the elastic sheet is fixed to the permanent magnet, and the other end of the elastic sheet is directly welded to a base or a housing of the support. The direct welding between the elastic sheet and the base or the housing may affect properties of the metal of the elastic sheet, and therefore, a vibration frequency of the elastic sheet may be affected. In this way, an inherent frequency of the elastic sheet may be less consistent with a frequency of a change in a current direction, such that accuracy and efficiency of the reciprocating motion of the motor may be affected.

The above description is provided for understanding the technical solution of the present disclosure only, and shall not be interpreted as the prior art of the present disclosure.

SUMMARY OF THE DISCLOSURE

Accordingly, the present disclosure provides a reciprocating magnetic levitation linear motor to improve consistency of vibration of the linear motor.

The present disclosure provides a reciprocating magnetically levitated linear motor, including: a bracket, two elastic support modules, a driving assembly, and a motion assembly suspended above the driving assembly. The driving assembly is mounted on the bracket and configured to take an electromagnetic action to drive the motion assembly to reciprocate in a predetermined direction. The motion assembly has two ends in the predetermined direction, one of the two elastic support modules is configured to connect one of the two ends to the bracket, and the other one of the two elastic support modules is configured to connect the other one of the two ends to the bracket.

Each of the two elastic support modules comprises a plate spring sheet, an adapter assembly, and a first connection member, the plate spring sheet has a first connection end and a second connection end, the first connection end is fixedly connected to the motion assembly, the first connection member extends through the second connection end and the adapter assembly and connects the second connection end with the adapter assembly, the plate spring sheet is fixedly connected to the bracket via the adapter assembly.

In some embodiments, the bracket comprises a housing and a base; the base, the motion assembly, and the driving assembly are arranged inside the housing; the driving assembly and the adapter assembly are fixedly mounted to the base.

In some embodiments, the base extends in the predetermined direction into an elongated strip, two ends of the base in a length direction protrude out of the motion assembly to form two mounting sections, each of the two mounting sections defines a positioning slot, the adapter assembly is adapted to and inserted in the positioning slot, and the adapter assembly is welded to an inner surface of the positioning slot.

In some embodiments, the adapter assembly comprises two insertion blocks that are opposite to each other, the two insertion blocks clamp two sides of a plate of the second connection end, the first connection member extends through the two insertion blocks and the second connection end and connects the two insertion blocks with the second connection end.

In some embodiments, the first connection member is a rivet, an upper surface of the base is recessed to define the positioning slot, and the base defines a reservation space corresponding to the rivet.

In some embodiments, a bottom wall of the positioning slot defines a positioning through hole, each of the two insertion blocks comprises a body portion and an insertion portion connected to a lower surface of the body portion, the insertion portion is adapted to and inserted in the positioning through hole, the body portion is adapted to and embedded in the positioning slot and abuts against the bottom wall of the positioning slot.

In some embodiments, two ends of the body portion in a width direction of the base protrude out of the insertion portion, the width direction of the base intersects with an up-down direction and the length direction of the base; the second connection end comprises a body section and an insertion section connected to a lower surface of the body section; the insertion section is clamped between two insertion portions of the two insertion blocks, the body section is clamped between two body portions of the two insertion blocks; the insertion section is inserted in the positioning through hole, and the lower surface of the body section abuts against the bottom wall of the positioning slot.

The body portion is welded to an inner surface of the positioning slot, and the insert portion is welded to an inner surface of the positioning through hole.

In some embodiments, the plate spring sheet is a strip configured in a coiled pattern, an end at a center of the coiled pattern of the plate spring sheet serves as the first connection end, an outer end of the plate spring sheet serves as the second connection end; the motion assembly comprises a magnet mounting base and a magnet mounted in the magnet mounting base, a connection section is formed at each of two ends of the magnet mounting base, and the connection section of each of the two ends is inserted and welded to the first connection end of a corresponding one of the two elastic support modules.

In some embodiments, the reciprocating magnetically levitated linear motor further includes two suspended vibration damping modules. Each of the two suspended vibration damping modules comprises a rebound sheet, a clamping block assembly, and a second connection member, the second connection member extends through a lower end of the rebound sheet and the clamping block assembly and connects the lower end of the rebound sheet to the clamping block assembly, the clamping block assembly is fixedly connected to the base; an upper end of the rebound sheet is fixedly connected to the housing, and the base is spaced apart from the housing.

In some embodiments, the clamping block assembly comprises two clamping blocks that are opposite to each other, the lower end of the rebound sheet is clamped between the two clamping blocks, and the second connection member extends through the two clamping blocks and the rebound sheet and connects the two clamping blocks with the rebound sheet.

In some embodiments, an insertion bump is arranged at and protruding from each of two ends of the base in the predetermined direction, each of the two clamping blocks defines a first insertion hole corresponding to the insertion bump, the rebound sheet defines a second insertion hole corresponding to the insertion bump, the insertion bump is adapted to and inserted in the first insertion hole and the second insertion hole, the insertion bump is welded to an inner wall of the first insertion hole.

In some embodiments, the rebound sheet comprises a lateral extension section and two vertical extension sections, the two vertical extension sections are arranged side by side, a lower end of one of the two vertical extension sections is connected to one of two ends of the lateral extension section, a lower end of the other one of the two vertical extension sections is connected to the other one of the two ends of the lateral extension section. The second insertion hole is defined in the lateral extension section, the two clamping blocks clamp two sides of a plate of the lateral extension section, the second connection member extends through the two clamping blocks and the lateral extension section and connects the two clamping blocks with the lateral extension section. Each of the two suspended vibration damping modules further comprises a lateral connection sheet, an upper end of each of the two vertical extension sections is clamped between the lateral connection sheet and the housing.

In some embodiments, the second connection member is a rivet. The lateral extension section defines two through holes corresponding to the two vertical extension sections respectively, the second insertion hole is located between the two through holes. The rivet extends through the through holes and the two clamping blocks to fixedly connect the rebound sheet to the clamping block module. The upper end of each of the two vertical extension sections is fixedly connected between the housing and the lateral connection sheet by a rivet.

In some embodiments, the housing comprises a housing body and a mounting bump, the housing body has two ends in the predetermined direction, the mounting bump is connected to a top surface of each of the two ends of the housing body, the upper end of the rebound sheet is fixedly connected to an inner surface of the mounting bump, and a top surface of the rebound sheet is higher than or aligned with a top surface of the plate spring sheet.

The present disclosure further provides an electric shear device, including a cutting assembly and a reciprocating magnetically levitated linear motor.

The reciprocating magnetically levitated linear motor includes a bracket, two elastic support modules, a driving assembly, and a motion assembly suspended above the driving assembly. The driving assembly is mounted on the bracket and configured to take an electromagnetic action to drive the motion assembly to reciprocate in a predetermined direction. The motion assembly has two ends in the predetermined direction, one of the two elastic support modules is configured to connect one of the two ends to the bracket, and the other one of the two elastic support modules is configured to connect the other one of the two ends to the bracket.

Each of the two elastic support modules comprises a plate spring sheet, an adapter assembly, and a first connection member, the plate spring sheet has a first connection end and a second connection end, the first connection end is fixedly connected to the motion assembly, the first connection member extends through the second connection end and the adapter assembly and connects the second connection end with the adapter assembly, the plate spring sheet is fixedly connected to the bracket via the adapter assembly.

The motion assembly of the reciprocating magnetically levitated linear motor is connected to the cutting assembly to drive the cutting assembly to move reciprocally.

In the present disclosure, the elastic support module includes a plate spring sheet, an adapter assembly, and a first connection member. A first connection end of the plate spring sheet is fixedly connected to the motion assembly, and a second connection end of the plate spring sheet is fixedly connected to the adapter assembly via the first connection member. In this way, the entire plate spring sheet is fixed to the bracket via the adapter assembly. Compared to directly welding the plate spring sheet to the bracket, the present disclosure avoids an influence on metal properties of the plate spring sheet caused by welding, such that a vibration frequency of the plate spring sheet may not be affected, the inherent frequency of the plate spring sheet may be more consistent with the frequency of the change in the current direction, the accuracy and the efficiency of the reciprocating motion of the motor may be ensured, and quality of the product may be improved.

BRIEF DESCRIPTION OF THE DRAWINGS

In order to illustrate more clearly the technical solutions in the embodiments of the present disclosure, the accompanying drawings used in the description of the embodiments will be described in brief. Apparently, the accompanying drawings in the following description show only some embodiments of the present disclosure, and other drawings may be obtained by any ordinary skilled person in the art based on these drawings without creative work.

REFERENCE NUMERALS

Figure 1:
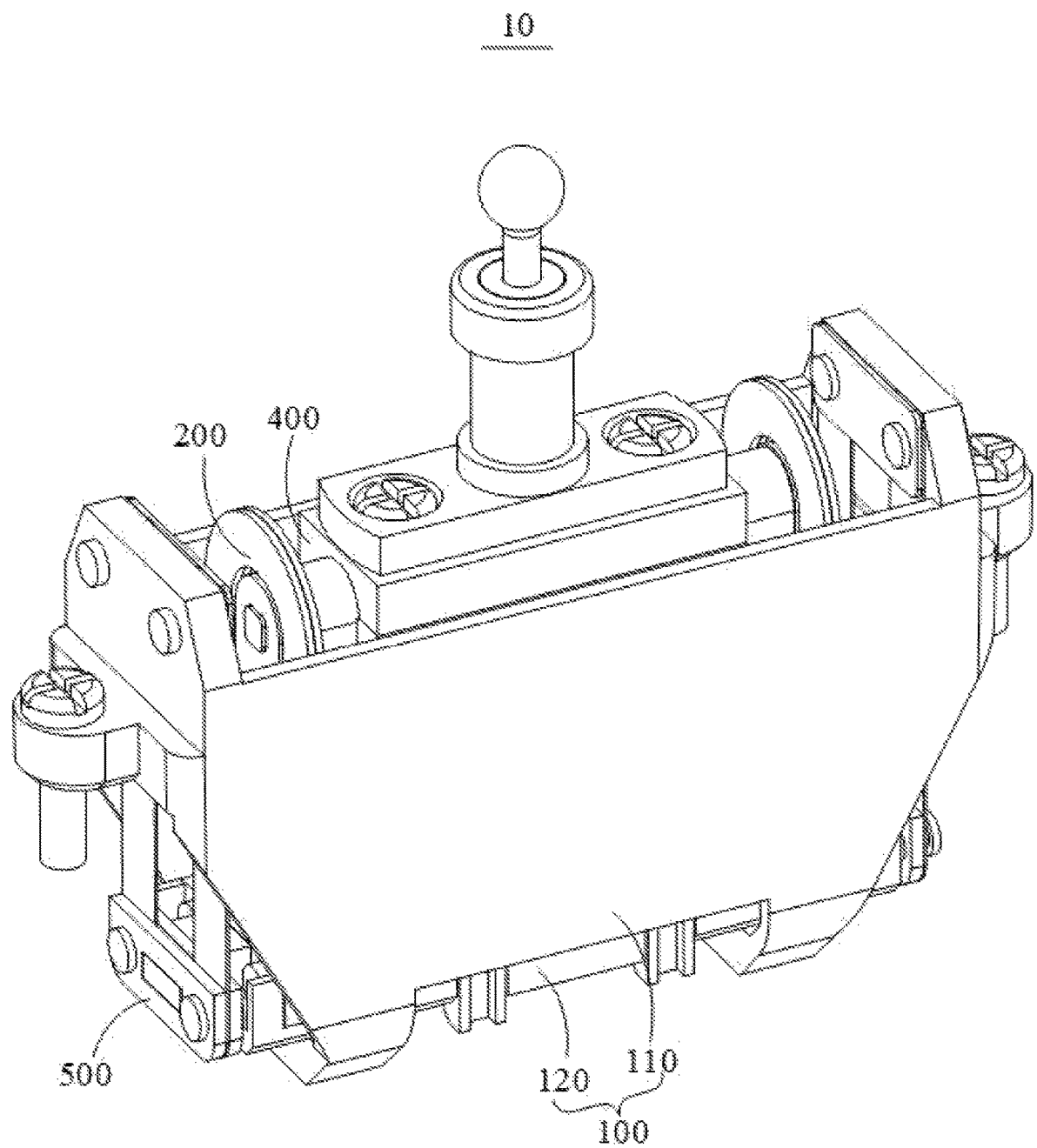
FIG. 1 is a structural schematic view of a reciprocating magnetically levitated linear motor according to an embodiment of the present disclosure.

| Reference No. | name |
|---|---|
| 10 | Reciprocating magnetically levitated linear motor |
| 100 | bracket |
| 110 | housing |
| 111 | Housing body |
| 112 | Mounting bump |
| 120 | Base |
| 121 | Mounting section |
| 122 | Positioning slot |
| 123 | Positioning through hole |
| 124 | Reservation space |
| 125 | Insertion bump |
| 200 | Elastic support module |
| 210 | Plate spring sheet |
| 211 | First connection end |
| 212 | Second connection end |
| 213 | Body section |
| 214 | Insertion section |
| 220 | Adapter assembly |
| 221 | Insertion block |
| 222 | Body portion |
| 223 | Insertion portion |
| 230 | First connection member |
| 300 | Driving assembly |
| 400 | Motion assembly |
| 410 | Magnet mounting base |
| 411 | Connection section |
| 420 | magnet |
| 500 | Suspended vibration damping module |
| 510 | Rebound sheet |
| 511 | Lateral extension section |
| 512 | Second insertion hole |
| 513 | Through hole |
| 514 | Vertical extension section |
| 520 | Clamping block assembly |
| 521 | Clamping block |
| 522 | First insertion hole |
| 530 | Second connection member |
| 540 | Lateral connection sheet |

Purpose implementation, functional features and advantages of the present disclosure will be further described by referring to the embodiments and the accompanying drawings.

DETAILED DESCRIPTION

The technical solutions in the embodiments of the present disclosure will be clearly and completely described below by referring to the accompanying drawings in the embodiments of the present disclosure. Obviously, the embodiments described show only a part of but not all of the embodiments of the present disclosure. Based on the embodiments in the present disclosure, all other embodiments obtained without creative work by any ordinary skilled person in the art shall fall within the scope of the present disclosure. In addition, the technical solutions of the various embodiments may be combined with each other, but the combination must be achieved by the ordinary skilled person in the art. When combination of technical solutions is contradictory or unrealizable, such combination of technical solutions shall be deemed as not existing and is not within the scope of the present disclosure.

In addition, the term "first", "second", and so on, in an embodiment of the present disclosure are used for descriptive purposes only and shall not be understood as indicating or implying relative importance or as implicitly specifying the number of technical features indicated. Therefore, features qualified with "first" and "second" may explicitly or implicitly include at least one such feature. Furthermore, "and/or" in the specification means that three concurrent solutions exist. For example, "A and/or B" indicates a solution A, or a solution B, or a solution of both A and B.

The present disclosure provides a reciprocating magnetically levitated linear motor.

In the embodiments, as shown in FIG. 1 to FIG. 4, the reciprocating magnetically levitated linear motor 10 includes a bracket 100, two elastic support modules 200, a driving assembly 300, and a motion assembly 400 suspended above the driving assembly 300. The driving assembly 300 is arranged on the bracket 100 to take an electromagnetic action to drive the motion assembly 400 to reciprocate in a predetermined direction. One of two ends of the motion assembly 400 in the predetermined direction is connected to the bracket 100 by one of the two elastic support modules 200, and the other one of the two ends of the motion assembly 400 in the predetermined direction is connected to the bracket 100 by the other one of the two elastic support modules 200.

The elastic support module 200 includes a plate spring sheet 210, an adapter assembly 220, and a first connection member 230. The plate spring sheet 210 has a first connection end 211 and a second connection end 212. The first connection end 211 is fixedly connected to the motion assembly 400. The first connection member 230 extends through the second connection end 212 and fixes the second connection end 212 to the adapter assembly 220. The plate spring sheet 210 is fixedly connected to the bracket 100 via the adapter assembly 220.

In the present embodiment, the bracket 100 serves as a body of the entire reciprocating magnetically levitated linear motor 10. The bracket 100 provides mounting for the driving assembly 300 and other components. The bracket 100 may include only a base 120, and in this case, the driving assembly 300 and the adapter assembly 220 are both fixed to the base 120. In some embodiments, the bracket 100 may include only a housing 110, and in this case, the driving assembly 300 and the adapter assembly 220 are both fixed to the housing 110. In some embodiments, the bracket 100 may include the base 120 and the housing 110, and in this case, the driving assembly 300 is fixed to the base 120, and the adapter assembly 220 is fixed to the base 120 or the housing 110.

The motion assembly 400 may specifically include a permanent magnet and a magnet mounting base 410. The permanent magnet is fixed to the magnet mounting base 410. Each of two ends of the magnet mounting base 410 is connected to the bracket 100 by one elastic support module 200. The driving assembly 300 includes an iron core, a winding frame, and a coil. The coil winds the winding frame and is mounted on the core via the winding frame. The core may be a U-shaped core, an E-shaped core, and so on. A type of the core may be determined according to actual needs and will not be limited herein. In some embodiments, only one driving assembly 300 may be arranged, and in this case, one or two motion assemblies 400 may be arranged. When two motion assemblies 400 are arranged, a magnetic pole of the permanent magnet of one of the two motion assemblies 400 is disposed corresponding to and facing a magnetic pole of the permanent magnet of the other one of the two motion assemblies 400, and the magnetic pole of the one of the two motion assemblies 400 is opposite to the corresponding magnetic pole of the other one of the two motion assemblies 400. In this way, the one driving assembly 300 may simultaneously drive the two motion assemblies 400 to reciprocate in opposite directions. Of course, two or more driving assemblies 300 may be arranged. When two drive assemblies 300 are arranged, two motion assemblies 400 may be arranged. Each motion assembly 400 is disposed above one of the two driving assemblies 300. In this way, each of the two driving assemblies 300 respectively drive one corresponding motion assemblies 400, allowing the two motion assemblies 400 to reciprocate in opposite directions. The present disclosure does not limit the number of driving assemblies 300 and the number of motion assemblies 400, and the numbers may be determined based on a type of the reciprocating magnetically levitated linear motor 10.

To be noted that any directional indication (such as up, down, left, right, forward, back . . . ) in the present disclosure is only used to explain a relative position relationship between components in a particular attitude, movement of the components in the particular attitude. When the particular attitude changes, the directional indications may change accordingly. Each of two ends of the motion assembly 400 is connected to the bracket 100 via one of the two elastic support modules 200. In this way, the motion assembly 400 is suspended above the driving assembly 300 by the elastic support modules 200. When a coil of the driving assembly 300 is conducted with positive-negative alternating currents, the driving assembly 300 forms an electromagnet. Magnetic induction of the electromagnet and the permanent magnet, and elastic rebound of the two elastic support modules 200, allows the driving assembly 300 to drive the motion assembly 400 to reciprocate in the predetermined direction. In practice, a cutting assembly may be mounted on the magnet mounting base 410 of the motion assembly 400. The reciprocating magnetically levitated linear motor 10 may drive a dynamic blade of an electric shear device to rapidly reciprocate with respect to a static blade to cut hair, or drive two dynamic blades of the electric shear device to reciprocate in opposite directions to cut hair.

The plate spring sheet 210 is a plate structure having certain elasticity. Generally, the plate spring sheet 210 is made of sheet metal. Each elastic support module 200 may include a certain number of plate spring sheets 210. For example, each elastic support module 200 may include one plate spring sheet 210 or two or more plate spring sheets 210. The two or more plate spring sheets 210 may be laminated on each other or may be spaced apart from each other. The number of plate spring sheets 210 may be determined based on actual requirements and is not specifically limited here. A shape of the plate spring sheet 210 may be various. For example, the plate spring sheet 210 may be in a mosquito-repellent incense plate shape, a runway coiled shape, a stripped shape, a framed shape, and so on, as long as the plate spring sheet 210 can support the motion assembly 400 to the bracket 100 stably and can provide an elastic rebound force for the plate spring sheet 210 to allow the plate spring sheet 210 to move reversely while the motion assembly 400 is reciprocating in the predetermined direction.

In order to increase structural strength, the adapter assembly 220 and the bracket 100 are usually made of metal. The first connection end 211 of the plate spring sheet 210 may be fixedly connected to the motion assembly 400 by welding, insertion-and-welding, and so on. The adapter assembly 220 may have various structures. For example, the adapter assembly 220 may have a block structure, a plate structure, and so on. The first connection member 230 may specifically be a rivet, a screw, a bolt, and so on. Specifically, each of the second connection end 212 of the plate spring sheet 210 and the adapter assembly 220 defines a through hole, allowing the first connector member 230 to extend through the through hole in the plate spring sheet 210 and the through hole in the adapter assembly 220 to securely connect the second connection end 212 of the plate spring sheet 210 to the adapter assembly 220.

In the present disclosure, the second connection end 212 of the plate spring sheet 210 is connected to the adapter assembly 220 via the first connection member 230. In this way, metal properties of the plate spring sheet 210 may not be affected while the plate spring sheet 210 is securely connected to the adapter assembly 220, and a vibration frequency of the plate spring sheet 210 is not affected. The adapter assembly 220 can be fixedly connected to the bracket 100 by welding, insertion-and-welding, and so on. By arranging the adapter assembly 220, the plate spring sheet 210 is fixed to the adapter assembly 220 by the first connection member 230, and the plate spring sheet 210 is fixed to the bracket 100 by the adapter assembly 220. Compared to directly fixing the plate spring sheet 210 to the bracket 100, the present disclosure allows the plate spring sheet 210 to be not directly fixed to the bracket 100. In this way, the metal properties of the plate spring sheet 210 may not be affected by welding, such that the frequency of the plate spring sheet 210 may be more consistent with the frequency of the change in the current direction, and vibration errors may be reduced.

In the present disclosure, the elastic support module 200 includes the plate spring sheet 210, the adapter assembly 220, and the first connection member 230. The first connection end 211 of the plate spring sheet 210 is fixed to the motion assembly 400. The second connection 212 of the plate spring sheet 210 is fixed to the adapter assembly 220 via the first connection member 230. In this way, the entire plate spring sheet 210 is fixed to the bracket 100 via the adapter assembly 220. Compared to directly welding the plate spring sheet to the bracket, the present disclosure avoids an influence on metal properties of the plate spring sheet caused by welding, such that a vibration frequency of the plate spring sheet may not be affected, the inherent frequency of the plate spring sheet may be more consistent with the frequency of the change in the current direction, the accuracy and the efficiency of the reciprocating motion of the motor may be ensured, and quality of the product may be improved.

In an embodiment, as shown in FIG. 1 to FIG. 4, the bracket 100 includes a housing 110 and a base 120. The base 120, the motion assembly 400, and the driving assembly 300 are arranged inside the housing 110. The driving assembly 300 and the adapter assembly 220 are fixedly mounted on the base 120.

In the present embodiment, a shape of the housing 110 may be various. For example, the housing 110 may be frame shaped, square-ring shaped, and so on. The shape of the housing 110 may be determined based on the actual needs and will not be limited herein. The base 120 may be block structured or disk structured. The base 120 may be directly fixedly connected to the housing 110. In some embodiments, the base 120 may be elastically connected to the housing 110 via an elastic member, and that is, the base 120 is suspendedly connected to the housing 110, such that vibration may be cushioned and further damped. The housing 110 is configured to provide a certain extent of protection for the motion assembly 400, the driving assembly 300, and so on, and is configured to mount the entire linear motor inside the housing 110 of the electric shear device.

The winding frame of the driving assembly 300 may be fixed to the base 120 by insertion and welding. Specifically, a positioning slot 122 may be defined in the base 120. During assembling the device, the adapter assembly 220 is firstly embedded in the positioning slot 122 in the base 120, and subsequently, the adapter assembly 220 is welded to an inner wall of the positioning slot 122 attached to the adapter assembly 220. In this way, the plate spring sheet 210 does not need to be welded directly to the base 120, the effect on the metal properties of the plate spring sheet 210 caused by welding may be effectively reduced or avoided. Compared to fixing the adapter assembly 220 to the housing 110, in the present disclosure, both the driving assembly 300 and the adapter assembly 220 are fixed to the base 120. Since a weight of the driving assembly 300 is much greater than a weight of the motion assembly 400, the driving assembly 300 may be taken to cushion and reduce the vibration passing to the housing 110, and the product may be used more comfortably.

In an embodiment, as shown in FIG. 1 to FIG. 5, the base 120 extends in a predetermined direction to form a stripped shape. Each of two ends of the base 120 in the length direction protrude out of the motion assembly 400 to form a mounting section 121. The mounting section 121 defines a positioning slot 122. The adapter assembly 220 is adapted to and embedded in the positioning slot 122. The adapter assembly 220 is welded to the inner surface of the positioning slot 122.

In the present embodiment, the base 120 extends in the predetermined direction to form the stripped shape. The driving assembly 300 is fixed to substantially a middle of the base 120. In this way, each of two ends of the base 120 in the length direction protrude out of the motion assembly 400, and the adapter assembly 220 is inserted into the positioning slots 122 of the mounting section 121, such that the driving assembly 300 is prevented from interfering oscillation of the plate spring sheet 210, an overall structure of the device is more compact, and a size of the device is smaller. By defining the positioning slot 122 in the mounting section 121, the adapter assembly 220 is adapted to and embedded in the positioning slot 122. Therefore, the positioning slot 122 allows the adapter assembly 220 to be positioned in advance, the adapter assembly 220 may be assembled more easily and more accurately. In order to ensure performance of the device, the base 120 and the adapter assembly 220 are both made of metal. The adapter assembly 220 is welded to the inner surface of the positioning slot 122, ensuring the adapter assembly 220 to be connected stably to the base 120, such that the performance of the device may be ensured. Specifically, a portion of an outer peripheral wall of the adapter assembly 220 contacting the inner wall of the positioning slot 122 is welded. In this way, the connection between the adapter assembly 220 and the base 120 may be more stable.

Further, as shown in FIG. 1 to FIG. 4, the adapter assembly 220 includes two insertion blocks 221 that are opposite to each other. The two insertion blocks 221 clamp two sides of a plate of the second connection end 212. The first connector member 230 extends through the two insertion blocks 221 and connect the insertion blocks to the second connection end 212.

In the present embodiment, each insertion block 221 may be long block structured or a squared block structured. The structure of the insertion block 221 can be determined according to dimensions of the plate spring sheet 210 and will not be limited herein. The two opposing insertion blocks 221 may have a same structure, different structures, or slightly different structures. In order to ensure the two insertion blocks 221 to clamp the second connection end 212 consistently, in some embodiments, the two insertion blocks 221 may have a same shape and a same size. In this way, the two insertion blocks 221 clamp the two sides of the plate of the second connection end 212, such that a contact area between the insertion blocks 221 and the second connection end 212 are maximized, allowing fixation between the insertion blocks 221 and the second connection end 212 to be more stable. The first connector member 230 extends through the two insertion blocks 221 and the second connection end 212 and connects the two insertion blocks 221 to the second connection end 212. The insertion blocks 221 and the second connection end 212 cooperatively form a block-like structure, allowing the second connection end 212 to be mounted into the positioning slot 122 more easily. In addition, since the two sides of the second connection end 212 of the plate spring sheet 210 is clamped between the two insertion blocks 22, the second connection end 212 of the plate spring sheet 210 may be effectively prevented from deforming and warping, further ensuring the frequency of the plate spring sheet 210 to be in consistent with the frequency of the change in the current directions, and reducing vibration errors.

In an embodiment, as shown in FIG. 1 to FIG. 4, the first connection end 230 is a rivet, an upper surface of the base 120 is recessed to define the positioning slot 122, and the base 120 defines a reservation space 124 corresponding to the rivet.

In the present disclosure, the first connector 230 is a rivet, compared to the a bolt or other elements, the rivet may prevent the first connection member 230 from loosening due to long term vibration, such that connection between the spring plate sheet 210 and the adapter assembly 220 may be more stable and reliable. The upper surface of the base 120 is recessed to form the positioning slot 122. In this way, the plate spring sheet 210 and the adapter assembly 220 are embedded in the positioning slot 122 from a top to a bottom, such that the adapter assembly 220 can be mounted in the positioning slot 122 more easily, an overall assembly efficiency may be improved. Since the reservation space 124 is defined at a location of the base 120 where the rivet is arranged, the base 120 may not interfere mounting of the rivet.

In addition to the above embodiments, as shown in FIG. 2 to FIG. 5, a bottom wall of the positioning slot 122 defines a positioning through hole 123. The insertion block 221 includes a body portion 222 and an insertion portion 223 connected to a lower surface of the body portion 222. The insertion portion 223 is adapted to and inserted in the positioning through hole 123. The body portion 222 is adapted to and inserted in the positioning slot 122 and abuts against the bottom wall of the positioning slot 122.

In the present embodiment, the bottom wall of the positioning slot 122 defines the positioning through hole 123, such that the insertion block 221 includes the body portion 222 and the insertion portion 223. The insertion portion 223 is adapted to and inserted in the positioning through hole 123. The body portion 222 is adapted to and inserted in the positioning slot 122 and abuts against the bottom wall of the positioning slot 122. In this way, two-level positioning of the insertion block 221 can be achieved, a positioning area and a welding area between the insertion block 221 and the base 120 can be increased effectively. The insertion block 221 may be mounted on the base 120 more accurately, and connection between the insertion block 221 and the base 120 may be more stable and reliable.

Further, as shown in FIG. 2 to FIG. 6, two ends of the body portion 222 in a width direction of the base 120 protrude out of the insertion portion 223. The width direction of the base 120 intersects with an up-down direction and the length direction of the base 120. The second connection end 212 includes a body section 213 and an insertion section 214 connected to a lower surface of the body section 213. The insertion section 214 is clamped between two insertion sections 223 of the two insertion blocks 221. The body section 213 is clamped between two body portions 222 of the two insertion blocks 221. The insertion section 214 is inserted in the positioning through hole 123. The lower surface of the body section 213 abuts against the bottom wall of the positioning slot 122.

The body portion 222 is welded to the inner surface of the positioning slot 122, and the insertion portion 223 is welded to an inner surface of the positioning through hole 123.

In the present embodiment, the body portion 222 is substantially elongated block structured. The second connection end 212 includes the body section 213 and the insertion section 214. The body section 213 is clamped between two body sections 222 of the two insertion blocks 221. The insertion section 214 is clamped between two insertion sections 223 of the two insertion blocks 221. That is, the second connection end 212 and the insertion blocks 221 are configured to have similar shapes. In this way, the contact area between the second connection end 212 and the insertion blocks 221 can be effectively increased, and the second connection end 212 may be mounted with the insert block 221 more accurately. Specifically, the width direction of the base 120 is perpendicular to the length direction and the up-down direction of the base 120. The two ends of the body section 222 in the width direction of the base 120 protrude out of the insertion portion 223, and two ends of the body section 213 in the width direction of the base 120 protrude out of the insertion section 214. In this way, the second connection end 212 is in a piece-like shape, such that the two insertion blocks 221 may clamp the second connection end 212 more securely and reliably.

In order to avoid interference, two ends of the positioning slot 122 may extend through two side walls of the base 120 in the width direction of the base 120. In this way, the positioning slot 122 is a through slot in the width direction of the base 120. Mounting of the insertion blocks 221 and the base 120 may not be interfered due to manufacturing tolerances or deformation of the insertion blocks 221 and the base 120. In addition, the insertion blocks 221 may be welded to the base 120 more easily.

The body portion 222 is welded to the inner surface of the positioning slot 122, and the insertion portion 223 is welded to the inner surface of the positioning through hole 123. Specifically, the bottom wall of the body portion 222 is welded to the bottom wall of the insertion slot, a side wall of one of the two body portions 222 away from the other one of the two body portions 222 and a side of the other one of the two body portions 222 away from the one of the two body portions 222 are welded to the side wall of the insertion slot, and the bottom circumference of the insertion portion 223 is welded to an inner circumference of the positioning through hole 123. While optimally increasing stability of the connection between the insertion blocks 221 and the base 120, the effect on the metal properties of the plate spring sheet 210 caused by the welding is reduced, further improving the consistency of the frequencies of the motor.

In an embodiment, as shown in FIG. 1 to FIG. 6, the plate spring sheet 210 extends in a coiled pattern. An end at a center of the coiled pattern of the plate spring sheets 210 serves as the first connection end 211, and an outer end of the coiled pattern of the plate spring sheet 210 serves as the second connection end 212. The motion assembly 400 includes the magnet mounting base 410 and the magnet 420 mounted in the magnet mounting base 410. A connection section 411 is formed at each of two ends of the magnet mounting base 410. Each connection section 411 is correspondingly inserted and welded to the first connection end 211.

In the present embodiment, the plate spring sheet 210 has a structure that a strip coils from a center outwardly. The plate spring sheet 210 is coiled in a mosquito-repellent incense shape, or in a runway coil shape, and so on, which will not be limited herein. The end at the center of the coiled pattern of the plate spring sheet 210 refers to a starting position which is at the center of the coiled pattern and where the coiling starts. The outer end of the plate spring sheet 210 refers to an end which is located at an outer of the coiled pattern and where the coiling ends. By configuring the plate spring sheet 210 as the centrally coiled pattern, a spring arm of the plate spring sheet 210 may be longer without increasing an occupation space. Therefore, sufficient spring forces and supports are provided for the motion assembly 400. In other words, the plate spring sheet 210 in the present embodiment provides sufficient spring forces and supports but occupies limited spaces, the overall size of the device is smaller.

The magnet mounting base 410 is made of metal to ensure structural strength. Specifically, the end at the center of the coiled pattern of the plate spring sheet 210 defines a through hole. The connection section 411 is adapted to and inserted in the through hole. Each connection section 411 of the magnet mounting base 410 is adapted to and inserted into the end at the center of the coiled pattern (the first connection end 211) of the plate spring sheet 210. In this way, the magnet mounting base 410 is mounted to the end at the center of the coiled pattern of the plate spring sheet 210 by being positioned in advance, and subsequent welding operations may be performed more easily. It shall be understood that, the end at the center of the coiled pattern of the plate spring sheet 210 is fixedly connected to the magnet mounting base 410. That is, the magnet 420 drives the end at the center of the coiled pattern of the plate spring sheet 210 to move reciprocally in the predetermined direction. Further, vibrations are passed to the base 120 via the plate spring sheet 210. The end at the center of the coiled pattern of the plate spring sheet 210 is a position where vibration starts, and the outer end is the end of vibration. Therefore, metal properties of the outer end of the plate spring sheet 210 have a greater influence on the vibration frequency, and metal properties of the end at the center of the coiled pattern of the plate spring sheet 210 have a smaller influence on the vibration frequency. Since the connection section 411 of the magnet mounting base 410 is welded to the first connection end 211, the vibration frequency of the plate spring sheet 210 is almost unaffected, and the magnet mounting 410 is securely connected to the plate spring sheet 210, and the plate spring sheet 210 is effectively prevented from falling off from the magnet mounting base 410 due to long-term vibration.

In combination with the above embodiment in which the adapter assembly 220 is fixedly mounted to the base 120, further as shown in FIG. 1 to FIG. 4 and FIG. 7, the reciprocating magnetically levitated linear motor 10 further includes two suspended vibration damping modules 500. Each suspended vibration damping module 500 includes a rebound sheet 510, a clamping block assembly 520, and a second connection member 530. The second connection member 530 extends through a lower end of the rebound sheet 510 and the clamping block assembly 520 and fixedly connect the lower end of the rebound sheet 510 with the clamping block assembly 520. The clamping block assembly 520 is fixedly connected to the base 120. An upper end of the rebound sheet 510 is fixedly connected to the housing 110, such that the base 120 is spaced apart from the housing 110.

In the present embodiment, the rebound sheet 510 is made of elastic material and has certain rigidity. For example, the rebound sheet 510 may be a metal sheet. Each suspended vibration damping module 500 may include a certain number of rebound sheets 510. For example, each suspended vibration damping module 500 may include only one rebound sheet 510. In some embodiments, each suspended vibration damping module 500 may include two or more rebound sheets 510, and the two or more rebound sheets 510 are laminated on each other or spaced apart from each other. The number of rebound sheets 510 may be determined according to actual requirements, and is not limited here. A shape of the rebound sheet 510 may be various. For example, the rebound sheet 510 may be in a coiled shape like a mosquito-repellent plate, a runway coiled shape, a frame shape, and so on. The rebound sheet 510 is configured to suspend the base 120 from the housing 110 to provide effective vibration cushioning and vibration absorption between the base 120 and the housing 110.

Since the base 120 is suspended from the housing 110 by the suspended vibration damping module 500, vibration of the motion assembly 400 is firstly passed to the base 120 through the elastic support module 200, most of the vibration is absorbed by the driving assembly 300 on the base 120, and the rest of the vibration is passed to the rebound sheet 510 of the suspended vibration damping module 500 to be further absorbed. At last, the unabsorbed vibration is passed to the housing 110. In this way, vibration of the entire linear motor is largely absorbed by the driving assembly 300 and the suspended vibration damping module 500, vibration of the housing 110 is effectively reduced. Since an end of the rebound sheet 510 is connected to the base 120 and the other end of the rebound sheet 500 is connected to the housing 110, a weight of the base 120 and the stator assembly is much greater than a weight of the motion assembly 400 and the cutting assembly, compared to the technical solution where one end of the rebound sheet 510 is connected to the motion assembly 400 and the other end is connected to the housing 110. In the present disclosure, the motion assembly 400 may apply a smaller initial acceleration to the rebound sheet 510, such that an oscillation amplitude of the rebound sheet 510 relative to the housing may be less, and the vibration may be damped more easily. The electric shear device configured with the linear motor can be used more comfortably, especially at high vibration frequencies.

In order to improve structural strength, the rebound sheet 510 and the clamping block assembly 520 are usually made of metal. The upper end of the rebound sheet 510 may be fixedly connected to the housing 110 by welding, riveting, and so on. The clamping block assembly 520 may have various structures, such as, having a block structure, a plate structure, and so on. The second connection member 530 may specifically be a rivet, a screw, a bolt, and so on. Specifically, each of the lower end of the rebound sheet 510 and the clamping block assembly 520 defines a through hole, such that the second connection member 530 extends through the through hole in the rebound sheet 510 and the through hole in the clamping block assembly 520 to securely connect the lower end of the rebound sheet 510 to the clamping block assembly 520.

The lower end of the rebound sheet 510 is connected to the clamping block assembly 520 by the second connection member 530. Therefore, while the rebound sheet 510 is securely connected to the clamping block assembly 520, the metal properties of the rebound sheet 510 may not be affected since the rebound sheet 510 is not welded, such that the vibration frequency of the rebound sheet 510 may not be affected. The clamping block assembly 520 may be fixedly attached to the base 120 by welding, insertion-and-welding, and so on. By arranging the clamping block assembly 520, the rebound sheet 510 is fixed to the base 120 by the second connection member 530, and the rebound sheet 510 is fixed to the base 120 by the clamping block assembly 520. Compared to the rebound sheet 510 being directly fixed to the base 120, the rebound plate 510 in the present disclosure does not directly contact or weld with the housing 110, such that the metal properties of the rebound plate 510 may not affected by welding, and a vibration damping effect may be improved.

Further, as shown in FIG. 1 to FIG. 4, the clamping block assembly 520 includes two clamping blocks 521 opposite to each other. The lower end of the rebound sheet 510 is clamped between the two clamping blocks 521. The second connection member 530 extends through the two clamping blocks 521 and the rebound sheet 510 and connect the two clamping blocks 521 with the rebound sheet 510.

In the present embodiment, each clamping block 521 can be elongated block structured or squared block structured. The structure of the clamping block 521 can be determined according to a size of the rebound sheet 510 and will not be limited herein. The two opposite clamping blocks 521 may have a same shape and a same size or have different shapes and different sizes or have slightly different shapes and slightly different sizes. In order to ensure the clamping blocks to clamp the lower end of the rebound sheet 510 consistently, in some embodiments, the two opposite clamping blocks 521 may have a same shape and a same size. The two clamping blocks 521 clamp two sides of a plate at the lower end of the rebound sheet 510. In this way, a contact area between the two clamping blocks 521 and the rebound sheet 510 is maximized, allowing fixation between the clamping blocks 521 and the rebound sheet 510 to be more stable. The second connection member 530 extends through the two clamping blocks 521 and the lower end of the rebound sheet 510 and connects the two clamping blocks 521 with the lower end of the rebound sheet 510. In this way, the clamping blocks 521 and the lower end of the rebound sheet 510 cooperatively form a block structure, allowing the lower end of the rebound sheet 510 to be mounted on the base 120 more easily. In addition, two sides of the lower end of the rebound sheet 510 is clamped between the two clamping blocks 521. Therefore, the lower end of the rebound sheet 510 may be prevented from deforming and warping, further ensuring the vibration damping of the rebound sheet 510.

Further, as shown in FIG. 1 to FIG. 5, each of two ends of the base 120 in a predetermined direction is arranged with an insertion bump 125. The clamping block 521 defines a first insertion hole 522 corresponding to the insertion bump 125, and the rebound sheet 510 defines a second insertion hole 512 corresponding to the insertion bump 125. The insertion bump 125 is adapted to and inserted in the first insertion hole 522 and the second insertion hole 512, and the insertion bump 125 is welded to an inner wall of the first insertion hole 522.

In the present embodiment, while assembling the device, the insertion bump 125 at each of the two ends of the base 120 is inserted in the first insertion hole 522 of the clamping block 521 and the second insertion hole 512 of the rebound sheet 510 to allow the base 120 to be mounted with the clamping block 521 and the rebound sheet 510 by being positioned in advance, such that subsequent welding operations can be performed more easily. Since the insertion bump 125 of the base 120 is welded to the inner wall of the first insertion hole 522, the vibration frequency of the rebound sheet 510 may not be affected, solid connection between the base 120 and the clamping block 521 and the rebound sheet 510 can be ensured, effectively preventing the rebound sheet 510 and the clamping block 521 from falling off from the base 120 due to long-term vibration. Specifically, an outer peripheral surface of the insertion bump 125 is welded to the inner wall of the first through hole 522.

Figure 7:
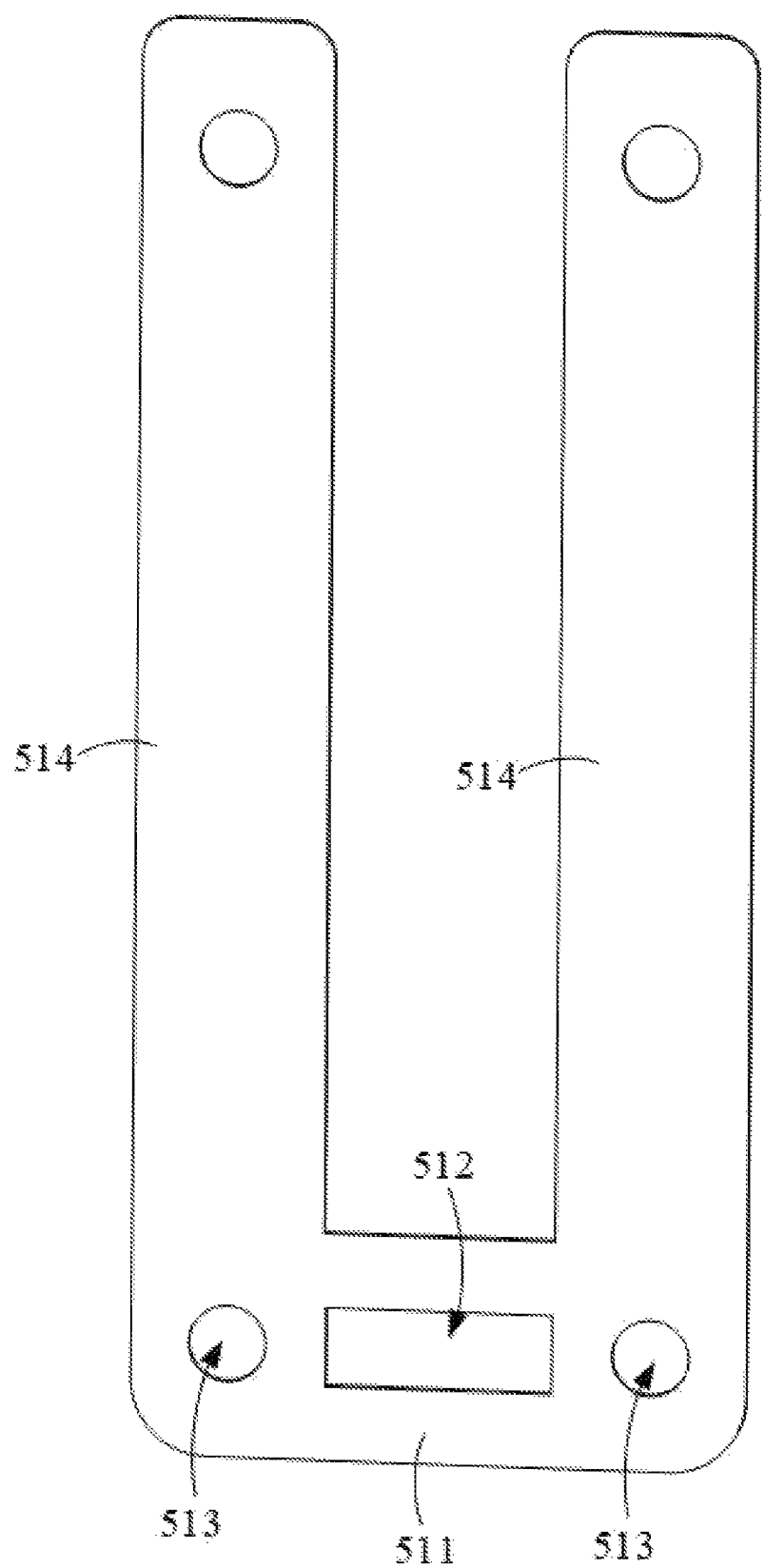
FIG. 7 is a structural schematic view of a rebound sheet according to an embodiment of the present disclosure.

In an embodiment, as shown in FIG. 7, the rebound sheet 510 includes a lateral extension section 511 and two vertical extension sections 514, and two vertical extension sections 514 are arranged side by side. A lower end of one of the two vertical extension sections 514 is connected to one of two ends of the lateral extension section 511, and a lower end of the other one of the two vertical extension sections 514 is connected to the other one of the two ends of the lateral extension section 511. The second insertion hole 512 is defined in the lateral extension section 511. The two clamping blocks 521 clamp two sides of the lateral extension section 511. The second connection member 530 extends through the lateral extension section 511 and the two clamping blocks 521 and connects the lateral extension section 511 with the two clamping blocks 521. The suspended vibration damping module 500 further includes a lateral connection sheet 540. Upper ends of the two vertical extension sections 514 are clamped between the lateral connection sheet 540 and the housing 110.

In the present embodiment, the lateral extension section 511 and the two vertical extension sections 514 are integrally formed into a one-piece structure. The rebound sheet 510 includes the lateral extension section 511 and the two vertical extension sections 514, and the two vertical extension sections 514 are provided side by side. Therefore, the rebound sheet 510 is substantially U-shaped. Compared to a ring shaped rebound sheet 510, an upper opening of the rebound sheet 510 in the U shape may absorb a mounting error, allowing the rebound sheet 510, the clamping blocks 520, and the housing 110 can be assembled more reliably, effectively preventing a rebound effect from being affected by deformation of the rebound sheet 510. Since the lateral connection sheet 540 is arranged, the upper ends of the two vertical extension sections 514 are clamped between the lateral connection sheet 540 and the housing 110, ensuring the vertical extension sections 514 to be stably connected to the housing 110.

The U-shaped rebound sheet 510 has a simple structure and is assembled easily. The two vertical extensions sections 514 of the rebound sheet 510 can provide a stable rebound force. In this way, a vibration damping effect and a supportive effect of the suspended damping module 500 can be ensured. The two clamping blocks 521 clamp two sides of the lateral extension section 511, the second connection member 530 extends through the clamping blocks 521 and the lateral extension section 511 and connects the clamping blocks 521 with the lateral extension section 511, and the second insertion hole 512 is defined in the lateral extension section 511. In this way, the lateral extension section 511 is completely taken to achieve the fixed connection between the rebound sheet 510 and the clamping blocks 521, preventing the second connection member 530 and the insertion bump 125 from affecting the rebound effect of the two vertical extension sections 514.

In an embodiment, as shown in FIG. 1 to FIG. 3 and FIG. 7, the second connection member 530 is a rivet. The lateral extension section 511 defines two through holes 513 corresponding to the two vertical extension sections 514. The second insertion hole 512 is located between the two through holes 513. The rivet extends through the through holes 513 and the clamping blocks 521 to fixedly connect the rebound sheet 510 to the clamping blocks 521. The upper end of each vertical extension section 514 is fixedly connected between the housing 110 and the lateral connection sheet 540 by a rivet.

In the present embodiment, the second connection member 530 is the rivet, compared to a bolt or other elements, the rivet effectively prevents the second connection member 530 from loosening due to long-term vibration, such that the connection between the rebound sheet 510 and the clamping block assembly 520 is more secure and reliable. The second insertion hole 512 is located between the two through holes 513. Each of two ends of each clamping block 521 in a lateral direction is connected to the lateral extension section 511 by the rivet. In this way, two ends of the lateral extension section 511 in the lateral direction are prevented from warping and deforming, such that connection between the lateral extension section 511 and the clamping blocks 521 can be more stable and reliable. After the rebound sheet 510 are connected to the two clamping blocks 521 by rivets, the rebound sheet 510 and the clamping blocks 521 cooperatively form one module. Further, the insertion block 221 of the base 120 is correspondingly embedded into a middle of the clamping block 521 and into a middle of the lateral extension section 511. Subsequently, contact edges between the insertion block 221 and the clamping block 521 and the lateral extension section 511 are welded. In this way, the suspended vibration damping module 500 is fixed to the base 120. The above fixation manner can be performed easily, and the assembling process is easy. The upper end of each vertical extension section 514 is fixed to the housing 110 and the lateral connection sheet 540 by the rivet. In this way, the vertical extension section 514 is stably connected to the housing 110 and the lateral connection sheet 540 and is prevented from loosening due to long-term use.

Figure 2:
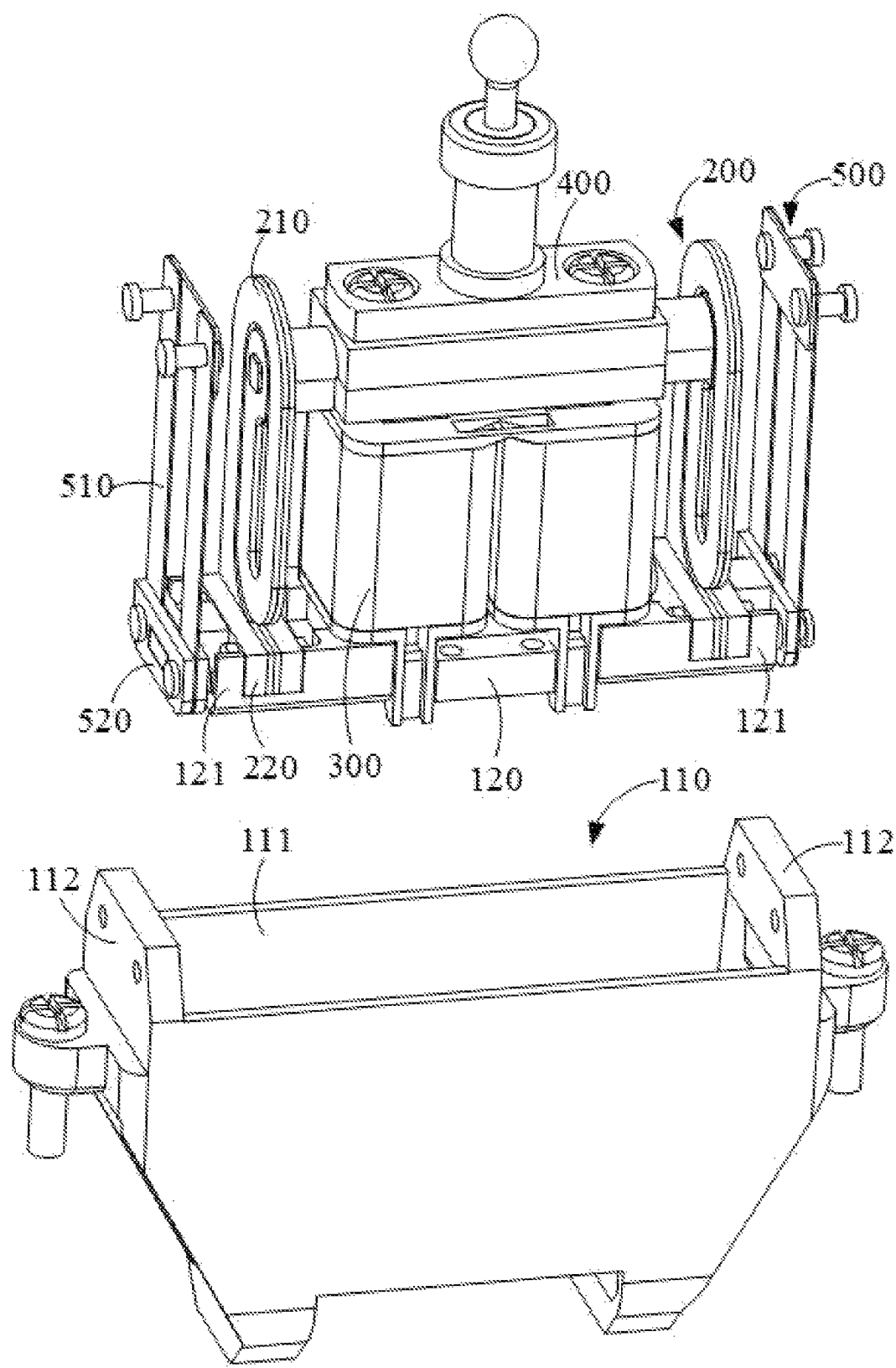
FIG. 2 is an exploded view of the reciprocating magnetically levitated linear motor shown in FIG. 1.
Figure 3:
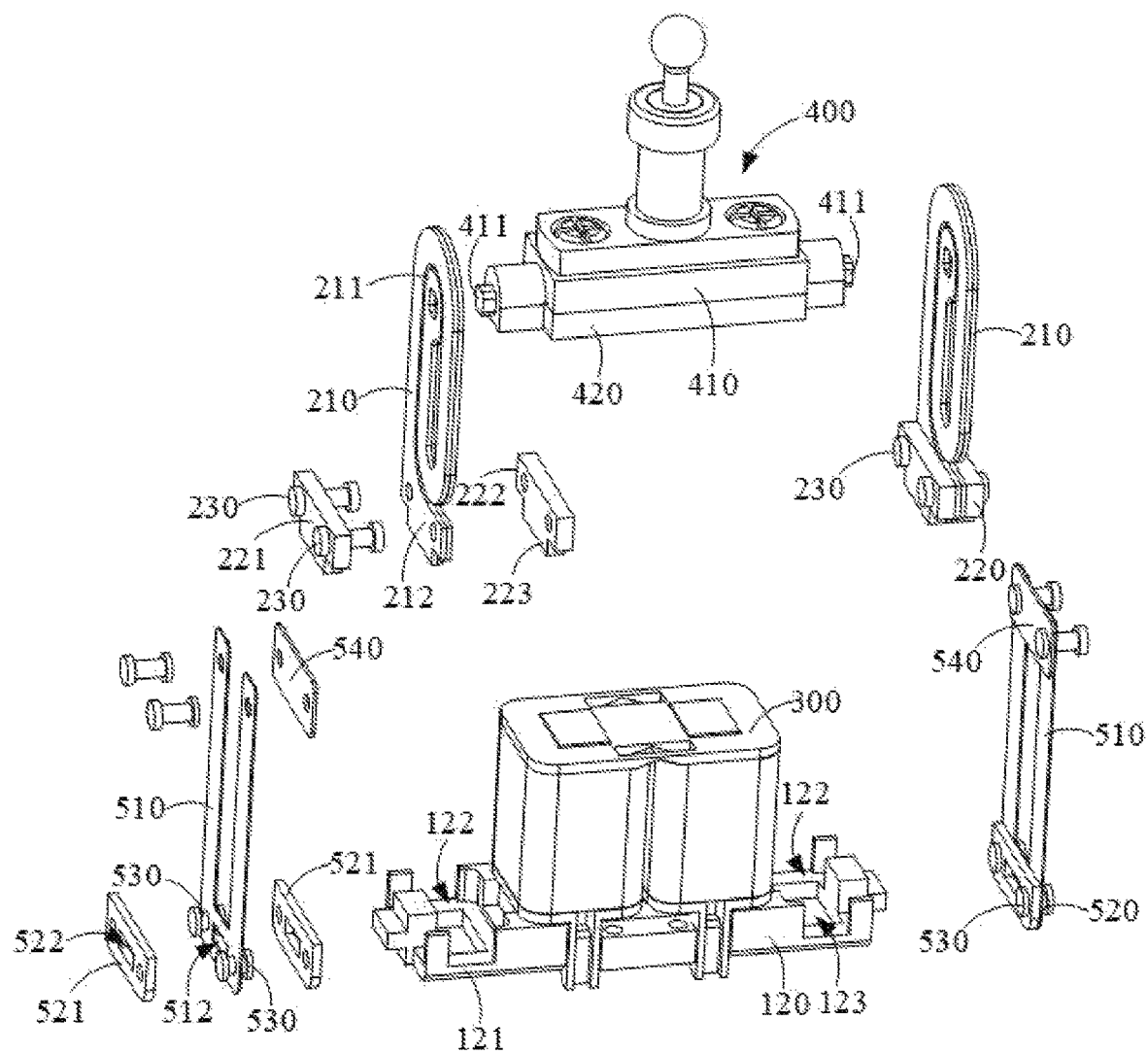
FIG. 3 is another exploded view of the reciprocating magnetically levitated linear motor shown in FIG. 1.
Figure 4:
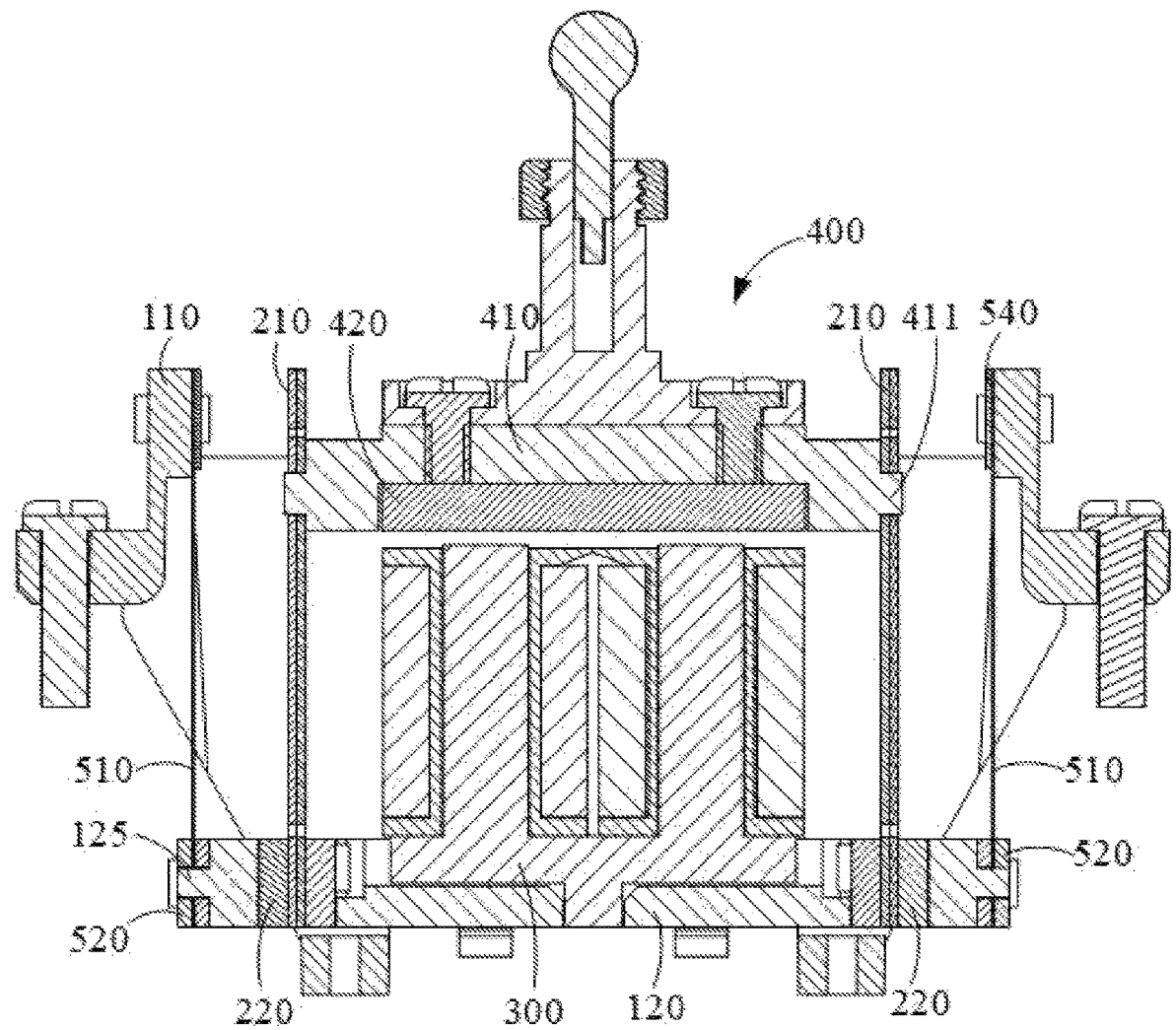
FIG. 4 is a cross-sectional view, taken from a viewing angle, of the reciprocating magnetically levitated linear motor shown in FIG. 2.
Figure 5:
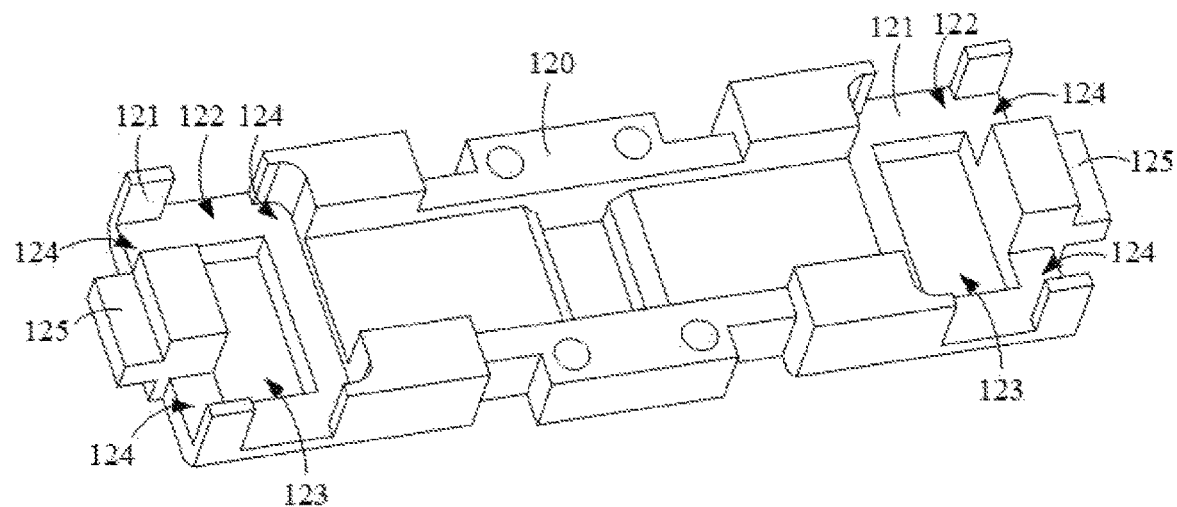
FIG. 5 is a structural schematic view of a base according to an embodiment of the present disclosure.
Figure 6:
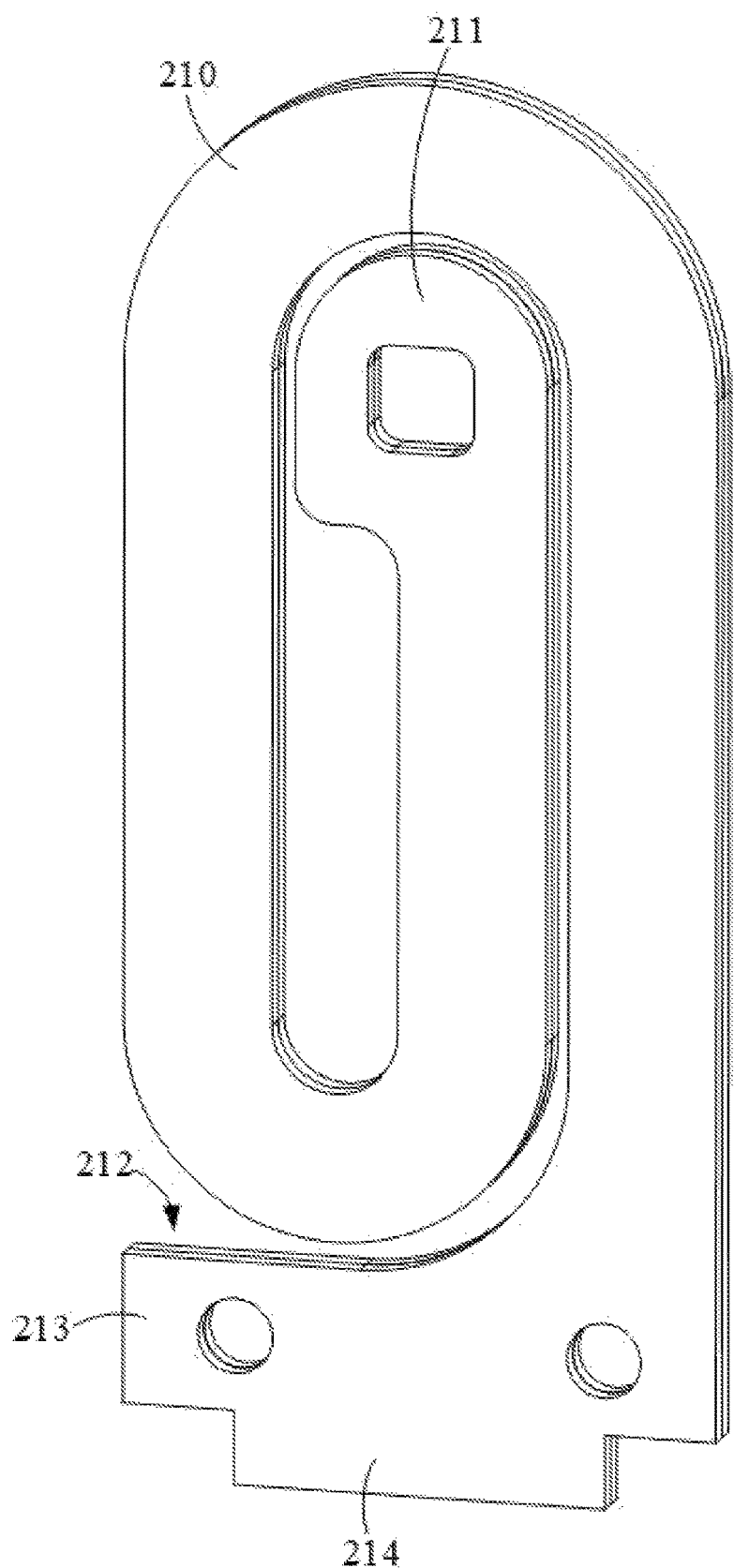
FIG. 6 is a structural schematic view of a plate spring sheet according to an embodiment of the present disclosure.

In an embodiment, as shown in FIG. 1 and FIG. 2, the housing 110 includes a housing body 111 and a mounting bump 112 connected to a top surface of each of two ends of the housing body 111 in a predetermined direction. The upper end of the rebound sheet 510 fixedly connected to an inner surface of the mounting bump 112. In this way, a top surface of the rebound sheet 510 protrudes out of or is aligned with a top surface of the plate spring sheet 210.

The mounting bump 112 is protruding from the top surface of the housing body 111, such that the upper end of the rebound sheet 510 is fixedly connected to the inner surface of the mounting bump 112 to avoid an external structure of the housing body 111 from interfering the elastic rebound of the rebound sheet 510. It shall be understood that as a length of the rebound sheet 510 increases, an oscillation amplitude of the rebound sheet 510 decreases. When an effective oscillation length of the rebound sheet 510 is less than an effective oscillation length of the plate spring sheet 210, the oscillation length of the rebound sheet 510 caused by the vibration passed from the base 120 to the rebound sheet 510 may be large, such that the housing 110 may be vibrated significantly. When the top surface of the rebound sheet 510 is higher than or aligned with the top surface of the plate spring sheet 210, the effective oscillation length of the rebound sheet 510 is greater than or equal to the effective oscillation length of the plate spring sheet 210, such that the oscillation amplitude of the rebound sheet 510 is relatively small, such that the vibration of the housing 110 may be reduced.

The present disclosure provides an electric shear device including a cutting assembly and a reciprocating magnetically levitated linear motor 10. A structure of the reciprocating magnetically levitated linear motor 10 refers to the above embodiments. The motion assembly 400 of the reciprocating magnetically levitated linear motor 10 is connected to the cutting assembly to drive the cutting assembly to move reciprocatively. Since the electric shear device employs all technical solutions of all the above embodiments, the electric shear device may have at least all the technical effects brought by the technical solutions of the above embodiments, which will not be repeated herein.

The electric shear device may be a shaver, a hair clipper, a trimmer, and so on, which will not be repeated herein. When the reciprocating magnetic levitation linear motor 10 has only one motion assembly 400, a movable cutter and a static cutter may be arranged, the movable cutter is connected to the motion assembly 400 of the reciprocating magnetically levitated linear motor 10. The movable cutter is driven by the reciprocating magnetically levitated linear motor 10 to move reciprocally relative to the static cutter to achieve shearing. When the reciprocating magnetically levitated linear motor 10 has two motion assemblies 400, the cutting assembly includes two movable cutters, the two movable cutters are connected to the two motion assemblies 400. The reciprocating magnetically levitated linear motor 10 drives the two movable cutters to reciprocate in opposite directions relative to each other to achieve shearing.

At last to be noted that, the above examples are intended only to illustrate the technical solutions of the present disclosure and not limit the present disclosure. Although the present disclosure is described in detail by referring to the examples, any ordinary skilled person in the art shall understand that the technical solutions described in the preceding examples can be modified, or some of the technical features can be replaced with equivalent ones. The modifications or replacements do not depart the essence of the technical solutions away from the concept and the scope of the present disclosure.

What is claimed is:

1. A reciprocating magnetically levitated linear motor, comprising: a bracket, two elastic support modules, a driving assembly, and a motion assembly suspended above the driving assembly;
wherein the driving assembly is mounted on the bracket and configured to take an electromagnetic action to drive the motion assembly to reciprocate in a predetermined direction;
the motion assembly has two ends in the predetermined direction, one of the two elastic support modules is configured to connect one of the two ends to the bracket, and the other one of the two elastic support modules is configured to connect the other one of the two ends to the bracket;
each of the two elastic support modules comprises a plate spring sheet, an adapter assembly, and a first connection member, the plate spring sheet has a first connection end and a second connection end, the first connection end is fixedly connected to the motion assembly, the first connection member extends through the second connection end and the adapter assembly and connects the second connection end with the adapter assembly, the plate spring sheet is fixedly connected to the bracket via the adapter assembly.

2. The reciprocating magnetically levitated linear motor according to claim 1, wherein the bracket comprises a housing and a base; the base, the motion assembly, and the driving assembly are arranged inside the housing; the driving assembly and the adapter assembly are fixedly mounted to the base.

3. The reciprocating magnetically levitated linear motor according to claim 2, wherein the base extends in the predetermined direction into an elongated strip, two ends of the base in a length direction protrude out of the motion assembly to form two mounting sections, each of the two mounting sections defines a positioning slot, the adapter assembly is adapted to and inserted in the positioning slot, and the adapter assembly is welded to an inner surface of the positioning slot.

4. The reciprocating magnetically levitated linear motor according to claim 3, wherein the adapter assembly comprises two insertion blocks that are opposite to each other, the two insertion blocks clamp two sides of a plate of the second connection end, the first connection member extends through the two insertion blocks and the second connection end and connects the two insertion blocks with the second connection end.

5. The reciprocating magnetically levitated linear motor according to claim 4, wherein the first connection member is a rivet, an upper surface of the base is recessed to define the positioning slot, and the base defines a reservation space corresponding to the rivet.

6. The reciprocating magnetically levitated linear motor according to claim 5, wherein a bottom wall of the positioning slot defines a positioning through hole, each of the two insertion blocks comprises a body portion and an insertion portion connected to a lower surface of the body portion, the insertion portion is adapted to and inserted in the positioning through hole, the body portion is adapted to and embedded in the positioning slot and abuts against the bottom wall of the positioning slot.

7. The reciprocating magnetically levitated linear motor according to claim 6, wherein two ends of the body portion in a width direction of the base protrude out of the insertion portion, the width direction of the base intersects with an up-down direction and the length direction of the base; the second connection end comprises a body section and an insertion section connected to a lower surface of the body section; the insertion section is clamped between two insertion portions of the two insertion blocks, the body section is clamped between two body portions of the two insertion blocks; the insertion section is inserted in the positioning through hole, and the lower surface of the body section abuts against the bottom wall of the positioning slot; and
the body portion is welded to an inner surface of the positioning slot, and the insert portion is welded to an inner surface of the positioning through hole.

8. The reciprocating magnetically levitated linear motor according to claim 2, wherein the plate spring sheet is a strip configured in a coiled pattern, an end at a center of the coiled pattern of the plate spring sheet serves as the first connection end, an outer end of the plate spring sheet serves as the second connection end; the motion assembly comprises a magnet mounting base and a magnet mounted in the magnet mounting base, a connection section is formed at each of two ends of the magnet mounting base, and the connection section of each of the two ends is inserted and welded to the first connection end of a corresponding one of the two elastic support modules.

9. The reciprocating magnetically levitated linear motor according to claim 2, further comprising two suspended vibration damping modules, wherein each of the two suspended vibration damping modules comprises a rebound sheet, a clamping block assembly, and a second connection member, the second connection member extends through a lower end of the rebound sheet and the clamping block assembly and connects the lower end of the rebound sheet to the clamping block assembly, the clamping block assembly is fixedly connected to the base; an upper end of the rebound sheet is fixedly connected to the housing, and the base is spaced apart from the housing.

10. The reciprocating magnetically levitated linear motor according to claim 3, further comprising two suspended vibration damping modules, wherein each of the two suspended vibration damping modules comprises a rebound sheet, a clamping block assembly, and a second connection member, the second connection member extends through a lower end of the rebound sheet and the clamping block assembly and connects the lower end of the rebound sheet to the clamping block assembly, the clamping block assembly is fixedly connected to the base; an upper end of the rebound sheet is fixedly connected to the housing, and the base is spaced apart from the housing.

11. The reciprocating magnetically levitated linear motor according to claim 4, further comprising two suspended vibration damping modules, wherein each of the two suspended vibration damping modules comprises a rebound sheet, a clamping block assembly, and a second connection member, the second connection member extends through a lower end of the rebound sheet and the clamping block assembly and connects the lower end of the rebound sheet to the clamping block assembly, the clamping block assembly is fixedly connected to the base; an upper end of the rebound sheet is fixedly connected to the housing, and the base is spaced apart from the housing.

12. The reciprocating magnetically levitated linear motor according to claim 9, wherein the clamping block assembly comprises two clamping blocks that are opposite to each other, the lower end of the rebound sheet is clamped between the two clamping blocks, and the second connection member extends through the two clamping blocks and the rebound sheet and connects the two clamping blocks with the rebound sheet.

13. The reciprocating magnetically levitated linear motor according to claim 10, wherein the clamping block assembly comprises two clamping blocks that are opposite to each other, the lower end of the rebound sheet is clamped between the two clamping blocks, and the second connection member extends through the two clamping blocks and the rebound sheet and connects the two clamping blocks with the rebound sheet.

14. The reciprocating magnetically levitated linear motor according to claim 11, wherein the clamping block assembly comprises two clamping blocks that are opposite to each other, the lower end of the rebound sheet is clamped between the two clamping blocks, and the second connection member extends through the two clamping blocks and the rebound sheet and connects the two clamping blocks with the rebound sheet.

15. The reciprocating magnetically levitated linear motor according to claim 12, wherein an insertion bump is arranged at and protruding from each of two ends of the base in the predetermined direction, each of the two clamping blocks defines a first insertion hole corresponding to the insertion bump, the rebound sheet defines a second insertion hole corresponding to the insertion bump, the insertion bump is adapted to and inserted in the first insertion hole and the second insertion hole, the insertion bump is welded to an inner wall of the first insertion hole.

16. The reciprocating magnetically levitated linear motor according to claim 13, wherein an insertion bump is arranged at and protruding from each of two ends of the base in the predetermined direction, each of the two clamping blocks defines a first insertion hole corresponding to the insertion bump, the rebound sheet defines a second insertion hole corresponding to the insertion bump, the insertion bump is adapted to and inserted in the first insertion hole and the second insertion hole, the insertion bump is welded to an inner wall of the first insertion hole.

17. The reciprocating magnetically levitated linear motor according to claim 15, wherein the rebound sheet comprises a lateral extension section and two vertical extension sections, the two vertical extension sections are arranged side by side, a lower end of one of the two vertical extension sections is connected to one of two ends of the lateral extension section, a lower end of the other one of the two vertical extension sections is connected to the other one of the two ends of the lateral extension section;

the second insertion hole is defined in the lateral extension section, the two clamping blocks clamp two sides of a plate of the lateral extension section, the second connection member extends through the two clamping blocks and the lateral extension section and connects the two clamping blocks with the lateral extension section;

each of the two suspended vibration damping modules further comprises a lateral connection sheet, an upper end of each of the two vertical extension sections is clamped between the lateral connection sheet and the housing.

18. The reciprocating magnetically levitated linear motor according to claim 17, wherein the second connection member is a rivet;

the lateral extension section defines two through holes corresponding to the two vertical extension sections respectively, the second insertion hole is located between the two through holes;

the rivet extends through the through holes and the two clamping blocks to fixedly connect the rebound sheet to the clamping block module;

the upper end of each of the two vertical extension sections is fixedly connected between the housing and the lateral connection sheet by a rivet.

19. The reciprocating magnetically levitated linear motor according to claim 9, wherein the housing comprises a housing body and a mounting bump, the housing body has two ends in the predetermined direction, the mounting bump is connected to a top surface of each of the two ends of the housing body, the upper end of the rebound sheet is fixedly connected to an inner surface of the mounting bump, and a top surface of the rebound sheet is higher than or aligned with a top surface of the plate spring sheet.

20. An electric shear device, comprising a cutting assembly and a reciprocating magnetically levitated linear motor according to claim 1, wherein the motion assembly of the reciprocating magnetically levitated linear motor is connected to the cutting assembly to drive the cutting assembly to move reciprocally.

* * * * *